(12) United States Patent
Smith

(10) Patent No.: US 8,128,979 B2
(45) Date of Patent: Mar. 6, 2012

(54) METHOD FOR PROCESSING RAW FRUIT TO PROVIDE ENHANCED FRUIT PRODUCTS AND THE FRUIT PRODUCTS PRODUCED BY THE METHOD

(76) Inventor: Jonathan D. Smith, Port Edwards, WI (US)

( * ) Notice: Subject to any disclaimer, the term of this patent is extended or adjusted under 35 U.S.C. 154(b) by 0 days.

(21) Appl. No.: 12/317,751

(22) Filed: Dec. 29, 2008

(65) Prior Publication Data

US 2010/0009059 A1    Jan. 14, 2010

Related U.S. Application Data

(60) Provisional application No. 61/134,854, filed on Jul. 14, 2008.

(51) Int. Cl.
*A23L 2/04* (2006.01)

(52) U.S. Cl. .................. 426/599; 426/489

(58) Field of Classification Search .............. 426/384, 426/599, 665, 524
See application file for complete search history.

(56) References Cited

U.S. PATENT DOCUMENTS

| | | | |
|---|---|---|---|
| 4,350,711 A | 9/1982 | Kahn et al. | |
| 5,000,972 A | 3/1991 | Mafisi-Movaghar | |
| 5,320,861 A | 6/1994 | Mantius et al. | |
| 5,419,215 A | 5/1995 | Herron et al. | |
| 5,747,088 A | 5/1998 | Fletcher | |
| 6,159,527 A * | 12/2000 | Wettlaufer | 426/639 |
| 6,440,467 B2 | 8/2002 | Mann | |
| 6,440,483 B1 | 8/2002 | Ghaedian et al. | |
| 6,880,455 B1 | 4/2005 | Ghaedian et al. | |
| 7,217,435 B2 | 5/2007 | Smith | |
| 2005/0186324 A1 | 8/2005 | Ghaedian et al. | |
| 2006/0013925 A1 | 1/2006 | Bauman et al. | |
| 2006/0134281 A1 * | 6/2006 | Cook et al. | 426/281 |
| 2009/0047400 A1 * | 2/2009 | Basker et al. | 426/335 |

OTHER PUBLICATIONS

Boyd, G., Eis(Ice) Wine, Wine Review Online, (Mar. 27, 2007) http://www.winereviewonline.com/gerald_boyd_on_ice_and_eis_wines.cfm.*
Caroline Scott-Thomas, New Cranberry Technology Tackles Tartness, Sep. 2009, pp. 1-7, accessed at Food Navigator—USA.com.*
Eck, Paul; The American Cranberry, 1990; pp. 129-131; Rutgers University Press; New Brunswick, NJ.
Canadian Office Action, corresponding Canadian Application No. 2,669,377, Jun. 2, 2011, 3 pages.
Smith et al., Freeze Concentration of Fruit Juices, NebGuide, Jan. 2006, G1600, University of Nebraska-Lincoln Extension, Lincoln, Nebraska, USA.

* cited by examiner

*Primary Examiner* — Lien T. Tran
*Assistant Examiner* — Philip Dubois
(74) *Attorney, Agent, or Firm* — John R. Flanagan

(57) ABSTRACT

A method for processing a fruit, such as a cranberry, includes cutting open a fruit and partially removing a highly concentrated juice fraction from the fruit when pressed while maintained within a sub-freezing temperature range. The skin of the frozen fruit is penetrated by being sliced or punctured facilitating juice extraction and subsequently infusion, such as by vacuum. Before extraction, the sliced fruit is uniformly tempered to a temperature below 32° F., more specifically to between 26° F. and 32° F. To extract juice, the fruit is pressed, removing from about 40% to 65% by weight of the liquid, yielding a concentrated fruit juice, with significantly enhanced brix, acid, and color, and a partially dehydrated fruit piece, with significantly reduced brix, acid, and color, and still within the given sub-freezing temperature range. The fruit piece may then be infused, such as under vacuum while being rotated, with a variety of ingredients.

16 Claims, No Drawings

METHOD FOR PROCESSING RAW FRUIT TO PROVIDE ENHANCED FRUIT PRODUCTS AND THE FRUIT PRODUCTS PRODUCED BY THE METHOD

CROSS-REFERENCES TO RELATED APPLICATIONS

This patent application claims the benefit of U.S. provisional application No. 61/134,854 filed Jul. 14, 2008. The disclosure of the provisional application is hereby incorporated herein by reference. This patent application also relates to co-pending patent application Ser. Nos. 12/317,752 and 12/317,743 filed the same date as this patent application. The disclosures of these patent applications are hereby incorporated herein by reference.

BACKGROUND OF THE INVENTION

The inventions disclosed herein generally relate to methods for processing natural fruit for baking and other diverse uses and, more particularly, is concerned with methods for processing raw fruit to produce enhanced products and fruit pieces produced by the methods.

Raw fruit, such as a cranberry, is a primary source of wholesome ingredients for many food and health products, with baked products being a well-known one. Baking trades typically make use of either a natural whole or sliced cranberry fruit, or a sweetened and dried cranberry (SDC), which is sugar infused and in a dehydrated state after a substantial portion of the juice has been removed.

However, one problem with utilization of a natural whole or sliced cranberry fruit for bakeries is the presence of a high acid concentration which, when used in baking, can result in an off-flavor to baked cranberry products, and may also affect the baking properties of the batter and its ingredients. A second problem relates to the high moisture content of the cranberry fruit whereby juices can weep into the bakery product and affect baking properties. This is an impediment to expansion of the market for inclusion of a natural cranberry fruit in baked products.

If bakeries want to utilize cranberries without the problems associated with high acid concentration, they have to utilize a highly processed sweetened and dried cranberry, SDC, whereby nearly all the juice and acid are removed from the fruit piece. Many of the natural characterizations of cranberry are lost in the manufacture of an SDC. These processes can include the processing of the cranberry into a sweetened and dried cranberry whereby a significant portion of the juice and acid is removed, a high concentration of sugar is infused (up to 70%) and then the cranberry is typically dried to moisture levels below 15% to make it a shelf-stable product. These further processes can diminish the flavor and degrade the character and palatability of the cranberry piece from that of its original natural state.

Consequently, a need exists for an innovation that will provide a solution to the aforementioned problems or shortcomings in the processing of raw fruit, such as a cranberry, for the baking trades without introducing any new problems in place thereof.

SUMMARY OF THE INVENTION

The inventions of this patent application and the related patent applications cross-referenced above provide for processing raw fruit, such as a cranberry, in a manner that is designed to satisfy the aforementioned need. Underlying these inventions is the recognition that enhanced results can be attained by subjecting raw fruit to extracting and infusing processes while being maintained within a given sub-freezing temperature range. These enhanced results relate to acid concentration of the resulting products, a concentrated fruit juice and dehydrated fruit piece. Sub-freezing extraction creates the desired acid-enhanced condition in the concentrated fruit juice and produces the desired acid-reduced condition in the resultant fruit piece. With the performance of extraction on fruit in the given sub-freezing temperature range, the acid concentration in the fruit piece drops up to about 28%, to 1.80% from 2.52%, a significant reduction.

Also, the improved cranberry fruit piece that results from the method has a lower brix level, lower TAcy, and lower moisture content, as well as lower acid concentration, than a whole or sliced cranberry fruit. The extraction and infusion processes of the inventions herein, are performed at temperatures that do not exceed 32° F. throughout their entire durations. Further, the resultant fruit piece is infused without using preservatives, without losing much of the natural aromatics contained within the fruit fraction, and without submerging the fruit piece into an infusion medium. Still further, a concentrated fruit juice is produced that has specific beneficial nutraceutical qualities, more specifically, the retention of aromatic volatiles, natural pectin, nutrients, vitamins, minerals, and other cranberry fractions that are typically lost in the enzymation and heating cycles of the production and/or concentration of typical cranberry fruit juice processed at temperatures above 32° F.

Accordingly, the invention of the subject patent application is directed to a method for processing raw fruit to produce enhanced products, comprising: subjecting a raw fruit to a predetermined mode of freezing to reach a given sub-freezing temperature range; penetrating the skin of the frozen raw fruit while maintained at a temperature within the given sub-freezing temperature range; and extracting from the penetrated frozen raw fruit a concentrated fruit juice having an acid concentration and a brix greater than that of the frozen raw fruit due to maintenance of the penetrating and extracting at a temperature within the given sub-freezing temperature range, such as between approximately 26° F. and 32° F.

The subject invention is also directed to a fruit juice produced by a method for processing raw fruit at a given temperature range, comprising the steps of: subjecting a raw fruit to a predetermined mode of freezing to reach a given sub-freezing temperature range; penetrating the skin of the frozen raw fruit while maintained at a temperature within the given sub-freezing temperature range; and extracting and recovering from the frozen raw fruit, a concentrated fruit juice having an acid concentration and a brix greater than the frozen raw fruit due to maintenance of the raw fruit at a temperature within the given sub-freezing temperature range.

The subject invention is also directed to a fruit juice product, comprising: a fruit juice concentrated while in a frozen raw fruit and remaining so after extraction of up to 65% of the liquid content, and without utilization of an altering form of concentration thereto through distillation or filtration, yielding a concentrated fruit juice with an acid concentration and a brix greater than the frozen raw fruit and qualified to be labeled as 'not from concentrate (NFC)'.

These and other features and advantages of the present invention will become apparent to those skilled in the art upon a reading of the following detailed description wherein there is described illustrative embodiments of the invention.

DETAILED DESCRIPTION OF THE INVENTIONS

Definitions

Before describing the inventions in detail, it would of benefit to the reader for gaining a clear understanding of the inventions to provide definitions of the various terms used hereinafter as follows:

Brix: A measurement for the concentration of soluble solids, (mostly sugar) in fruits, measured in percent, e.g. 5 brix equates to approximately 5% sugar.

SDC: An acronym for a 'sweetened and dried cranberry'.

IQF: An acronym for an 'instant quick freeze' whereby the product is frozen rapidly, usually within 5 minutes of entering the freezer.

Sub-Freezing: Temperatures below 32 F.

Given Sub-Freezing Temperature Range: Temperatures within approximately 26° F. and 32° F.

TAcy: An acronym for 'total anthocyanin concentration' and is a unit of color measurement used in a cranberry.

Acid: The percentage of acid concentration in a cranberry typically measured and calculated as citric acid because the largest acid component in a cranberry is citric acid.

Bucher Press: A bladder press made in France for extracting juices from fruits. Its chamber is filled with fruit, and a bladder is expanded inside the chamber, gently rotating and squeezing the juice from the fruit. The juice exits by troughs within the machine. The amount of juice obtained is determined by the atmospheres of pressure exerted on the fruit by the bladder within the chamber.

Cranberry: Scientific name: *Vaccinium macrocarpon*, AIT.

Cranberry Moisture Content: Fresh and fresh frozen cranberries are generally 12% solids (skin, pulp, seeds), and 88% liquid (juice), for an 88% moisture content.

Introduction

Turning now to a detailed description of the inventions, and particularly in connection with the processing of cranberry fruit, a method is disclosed for, at least partially, extracting or removing an acid-enhanced concentrated fruit juice from a cranberry when pressed between approximately 26° F. and 32° F. sub-freezing temperature range, producing an acid-reduced dehydrated cranberry fruit piece from the sub-freezing raw fruit, and infusing diverse ingredients into the acid-reduced dehydrated sub-freezing fruit piece. The frozen cranberry is punctured, such as by cutting, slicing or the like, to facilitate removal of its juice and the infusion of replacement materials. The fruit is uniformly tempered to an exact temperature below 32° F., more specifically between 26° F. and 32° F. The fruit is pressed using typical mechanical processes (removing up to 65% of the liquid), yielding a fruit juice with significantly higher brix (sugar content), acid content, and color, than fruit juice that is typically recovered from the exact same fruit. The resulting fruit piece, after pressing, is in a partially dehydrated condition, with a significantly lower brix, acid concentration, and color, and still frozen below 32° F. By example, with the present invention a dehydrated fruit piece with 40% of the juice extracted below 32 F will contain 60% less acid. In comparison, when fruit is pressed above 32 F, removal of 40% of the juice will only remove 40% of the acid, a significantly disproportionate amount.

The fruit piece can then be infused with a medium made up of a variety of ingredients such as colors, flavors, vitamins, minerals, and other juices. The medium is preferably infused within the same sub-freezing temperature range equal to or higher than the temperature of the fruit at pressing time and preferably in a chamber under vacuum of up to 26 mmHg while being tumbled in the infusion medium inside of a rotating vessel. The dehydrated fruit piece will absorb the infusion medium and rehydrate the cells quite rapidly and the medium will continue to permeate the entire fruit piece. Also, it has been determined that infusion can be performed with addition of cold, ambient or warm infusion liquid and then vacuum infused.

The fruit piece is then allowed to come to equilibrium while being maintained at the constant pressing temperature (optimally below 32° F.). The fruit piece is then frozen to 0° F. for long-term storage. Alternatively, the infused fruit piece can then be subjected to further processing such as chopping, dicing, and other preparations for baking applications. Also, the infused fruit piece can be dried into a powder which would have low acid concentration and also can be turned into a dried infused fruit piece with a lower acid content but higher juice content than a typical SDC.

In General

These inventions basically separate the overall process into three sequential phases in which three significant components are derived, some of which can be utilized separately, or combined. The first phase pertains to a particular mode of freezing that the fruit undergoes to reach a given sub-freezing temperature at which the fruit is most conducive to the further processing. The second phase pertains to an extraction process that provides a first component in the form of a high brix, acid-enhanced, concentrated fruit juice and a second component in the form of a low brix, acid-reduced, dehydrated fruit piece. The third phase pertains to an infusion process that transforms the second component into a third component in the form of a re-hydrated fruit, for instance a cranberry, providing an ingredient, for instance, in the baking of superior end products for consumers.

Freezing and Thawing Processes

In the first phase, after harvest, the raw fruit is preconditioned by being subjected to slow freezing temperatures over a predetermined period of time, for example, of at least 7 days and preferably up to at least 14 days, from 32° F. to 26° F. to prepare the raw fruit for freezing by a rapid drop from 26° F. to about 0° F. for long-term storage. As explained in more detail hereinafter on pages 8 and 9, only if preconditioning by slow freezing the fruit from 32° F. to 26° F. is done before rapid freezing (by further dropping the temperature from 26° F. down to 0° F.), will preconditioning produce the desired migration of different concentrated juice fractions to different localized regions within the fruit such that the different concentrated juice fractions can be selectively recovered later during processing when the fruit is maintained in the same temperature range as during preconditioning.

This period of preconditioning by slow freezing after harvest, before freezing by a drop to 0° F., and subsequent thawing of the fruit to and tempering of the fruit at between 26° F. and 32° F. for processing is critical to the success in extracting a concentrated fruit juice and recovering or retrieving a superior dehydrated fruit piece. The key to this process is determining the optimum sub-freezing temperature of the fruit. At harvest the fruit is cleaned using traditional cleaning methods in the industry. At that time the fruit is then placed into suitable containers, such as corrugated totes 40×48×41 inches, providing approximately 1500 lb. per box. The fruit is rapidly brought down to 32° F. before it is preconditioned by being slowly dropped from 32° F. to 26° F. and then frozen by being rapidly dropped from 26° F. to 0° F. for long-term storage. Although the exact time the fruit needs to be positioned between 32° F. and 26° F. is not an exact pre-determined calculation, success has been achieved in subsequent processes after the fruit has been so positioned for a time-period of at least 7 days and preferably up to 14 days.

Of greater importance is the thawing process as long-term stored fruit is tempered to the optimum pressing or juice extraction temperature. In preparing for subsequent processes, it is necessary to first establish a uniform temperature throughout the fruit, inside and out. Although there are various means to providing a uniform tempered fruit, the need to keep the fruit at its critical thawed temperature (between 26 F and 32° F.) should be emphasized in order to extract a desired concentrated fruit juice from the fruit. A successful technique is utilizing a blanket quilt to moderate the thawing process, or more precisely, placing the fruit in a climate controlled room. Additionally fruit can be uniformly thawed utilizing a temperature controlled water-bath or a heated surface. The fruit can then be monitored with a probe to achieve the necessary temperature. The more closely the temperature of the fruit is kept at its optimal extraction temperature between 32° F. and 26° F., the higher the concentration of juice that can be extracted from the fruit.

Furthermore, it is advantageous to segregate the fruit by color and sugar content, so that small portions of fruit with similar color and freeze/thaw temperatures can be pressed. Although not imperative, it provides the subsequent processes with a degree of uniformity that will provide higher yields and greater control of the finished product. For example, dark red cranberries with a brix of 8.0 had an optimal press temperature of 27° F. and yielded 15 brix, and 3.6% acid in its juice. White cranberries with a brix of 7.0 had an optimal press temperature of 29° F. and yielded 12 brix and 4.5% acid in its juice.

Penetrating (Cutting or Slicing), Pressing and Extracting Processes

In the second phase, the sub-freezing fruit is cut open and juice fractions are extracted or removed having a significantly higher concentration of the juice fractions than can normally be pressed from a thawed fruit. The skin of fruit is practically impervious to the release (or infusion) of any juice or liquid. Thus it is common in the industry to penetrate, by slicing or breaking, the skin of the fruit in some fashion to release the pressed liquid (or to infuse a solution). However, in the second phase, the fruit is cut open or sliced at a sub-freezing temperature that is very close to the optimum pressing temperature. The fruit preferably is only sliced in half to discourage thawing throughout the entire fruit prior to pressing.

Extraction or removal of the juice is accomplished preferably through utilizing any suitable mechanical or bladder press, such as a Bucher Press. This particular type of press utilizes pressure to gently and uniformly squeeze juice from the fruit. At optimum temperatures, a targeted volume of juice of, for example, 40% to 65%, without the use of enzymes and significant denaturing or loss of character of the fruit, may be extracted with only one to two bars of pressure applied to the fruit, which is really gentle on the fruit. The pressing operation per se is a conventional process in the industry and many different types of presses (e.g. vacuum, pressure, mechanical, and bladder) may be used.

Thus, after slicing, the sliced fruit is immediately loaded into the press that holds up to 800 lb. of fruit (although larger size presses are commercially available). When done at a temperature within the aforementioned proper sub-freezing temperature range it takes only about 30 minutes for the press to extract 40% to 65% of the concentrated juice. There is no need for the utilization of enzymes in this juice extraction process, thereby enabling a natural product that does not need to be heated to inactivate and kill the enzymes. The concentrated juice is then further processed using typical refining methods, or packaged for sale, and the dehydrated fruit pieces are recovered or retrieved and made ready for infusion.

It is important to note that the process of freezing the fruit to 0° F. and subsequent warming the fruit to sub-freezing temperatures between 26° F. and 32° F. for processing is a defining factor in the proper temperature needed to press a significantly higher concentration of juice from the fruit. Taking cranberries for instance, the cranberry has different concentrations of juice and juice components or fractions localized within the fruit. The initial process of slowly freezing the cranberry from 32° F. to 26° F. and then downward to 0° F. allows the juice components or fractions to localize within the fruit. As the cranberry begins to freeze at 32° F., the more dilute, low brix juice components begin to freeze within the fruit. As the cell wall components within the fruit break from the initial slow freezing, the more concentrated juice components coalesce within the fruit. As the fruit temperature drops from 32° F. to 26° F., the process continues and increasingly higher concentrations of the juice begin to coalesce together until the entire fruit is frozen below 26° F. At this point, there are localized regions of concentrated juice within the cranberry fruit; some with freezing points closer to 26° F. on up to those with freezing points near 32° F. The juice components or fractions, based on their brix concentration, thaw at temperatures between 26° F. and 32° F., while the more dilute juice (lower brix) within the fruit thaws at a higher temperature, closer to 32° F. These localized regions of higher brix concentrations within the juice allow us to selectively recover different fractions of juice while processing at precise fruit temperatures in the sub-freezing temperature range of 26° F. to 32° F.

If a fresh fruit is frozen too quickly, for example using IQF, there is very little migration of juice within the fruit and no localized areas of juice will coalesce within the fruit due to both the quick-freezing as well as the lack of cellular fracturing that occurs when the fruit rapidly freezes.

Likewise, when a slow-frozen fruit containing localized pockets of higher brix concentration is thawed to temperatures above 32° F., all components within the fruit are thawed and the juices are mixed, negating any chance of localized extraction of a higher concentrated juice fraction. If by chance the thawed fruit is once again subject to another slow freeze from 32° F. to 26° F. as described above, the process was not successful in localizing a concentrated juice, most likely because the juice fractions within the fruit have already mixed. Thus, freezing method is critically important in this invention.

Cranberry juice components of cranberries grown in Wisconsin in general average 8.0° brix, 2.4% acid, and 40TAcy color. When the cranberry is pressed using the press process just described, as mentioned approximately 40% of the juice was removed and the juice contained 16 brix, 3.8% acid, and higher color. Cranberry fruits can have a significant range of brix, acid, and color, all of which will impact the exact temperature needed for pressing the fruit under sub-freezing conditions (below 32° F.). White cranberry fruit have lower brix, higher acid, less color, and will release juice best at about 29.5° F., while dark red cranberry fruit will have higher brix, lower acid, and higher color. As a result of the higher sugar content, the freezing point of the juice trapped inside the fruit results in an optimal pressing temperature at about 27° F. The effectiveness of the ability to extract juice at these temperatures also centers on the technology of freezing or thawing the fruit slowly around the sub-freezing temperature range of from approximately 26° F. to 32° F.

The second phase ends with the aforementioned resulting product that is produced from the pressing process. When a partially thawed cranberry is pressed, concentrated juices are released and captured, and the cells that yielded the juice are in a partially dehydrated state (deprived of moisture). Also, underlying the invention is the realization that, as juice is pressed from the fruit, it also migrates to other nearby fruits, yielding a more uniform coloration of all remaining dehydrated fruit pieces after the pressing process is completed. This partially dehydrated fruit piece maintains a moisture content of about 50% and can be desirable for certain consumers that cannot utilize a fully hydrated cranberry because of its weeping properties. The fruit product created in this phase is also of higher quality for those consumers who need a lower acid cranberry product for baking that will not react negatively to other ingredients in a mixture such as muffin mixes.

An experiment was performed employing the process of the inventions herein within the give sub-freezing temperature range, for example at 27.5° F., compared to about room temperature, for example at 70° F. The fruit was pressed at the two temperatures. Both sub-freezing and room temperature fruit pieces had 48% moisture after pressing. However, the juice from the sub-freezing fruit piece had 1.7% acid and 3.0 brix while the room temperature fruit piece had 2.5% acid and 8.0 brix. The sub-freezing and room temperature juice produced after the press represented 40% of moisture recovered. However, the sub-freezing juice had 3.5% acid and 14.0 brix while the room temperature juice had 2.5% acid and 8.0 brix, the same as the room temperature fruit piece. The significant high quality of products obtained by the processes of the inventions herein is readily apparent.

Infusing and Other Processes

In the third phase, the resultant fruit product created in the second phase is now re-hydrated by infusion of a multitude of combinations of flavors, colors, sweeteners, minerals, vitamins, and sugars. The re-hydration will also take place at temperatures below 32° F., at temperatures very close to the press point that was utilized to expel the juice. The invention is unique because the deflated fruit created in the second phase has not been decharacterized during the pressing operation. Decharacterized fruit is defined as a fruit piece that does not retain the color, shape, and texture of the original fruit piece. Removal of the juice fraction at temperatures under 32° F. will not destroy the cellular integrity of the fruit piece, such that, when infused with liquid, the fruit piece can reabsorb liquid and return to its original character with similar texture, shape, and color.

The fruit pieces created in the second phase are in a deflated stasis. The collapsed cells within the fruit piece that yielded the juice are still sufficiently thawed enough to accept an infusion of liquid. It is at this point that the invention herein provides results not previously attained. This is due to the fact that, depending on the amount of infusion liquid added back to the cranberry fruit piece, the process of the invention can accurately define the overall uniformity in color, flavor, sweetness, juice content, and moisture content of the fruit piece.

Infusing cranberries with a liquid or syrup solution is a conventional practice. There are many different types of equipment and procedures for infusing fruit. While other infusion technologies in the industry involve immersing thawed fruit into an infusion syrup, these prior practices have drawbacks. Previous infusion technologies result in a decharacterized fruit piece upon completion. Other infusion procedures will result in a leaching of additional juice from the fruit. And none of these prior practices can accurately define the exact amount of moisture content, juice content, in a finished product.

The process of the invention disclosed herein may utilize either of two different methods for infusing the frozen fruit piece. The utilization of these two embodiments was found to be superior for controlling the extent of rehydration (moisture content).

In one exemplary embodiment of the inventions disclosed herein, a tumbler, or in the industry also called a Coater, is used to infuse the deflated fruit piece. The deflated fruit piece is essentially put into a tumbler drum and rotated at approximately 30 rpm. A defined volume of infusion medium is uniformly applied by a spray to the rotating fruit piece, evenly coating the fruit piece. Because an exacting volume can be applied to the fruit pieces, the process of the invention herein regulates the moisture content of the finished rehydrated fruit piece. It has been found that, using this procedure, a deflated fruit can reabsorb liquids up to 86% of its original weight prior to pressing.

In another exemplary embodiment of the inventions disclosed herein, the deflated or dehydrated fruit piece is put into a vacuum chamber of a vessel and a defined volume of liquid infusion medium is added to the chamber. A vacuum of up to 26 mmHg is pulled on the vessel, and concurrently the vessel is rotated for between 10 and 30 minutes. The liquid infusion medium is completely absorbed quickly and uniformly into the frozen fruit piece, and as a result, the fruit piece can even be the same weight as the original fruit piece prior to pressing. In the inventions disclosed herein, the fruit piece can rehydrate up to 100% of its initial weight, or, depending on the quantity of infusion added to the chamber, final fruit weight can be between 35% and 100% of the initial fruit weight. Once again, the characterization of the fruit piece is maintained.

After infusion is complete, the rehydrated fruit piece can be frozen to 0° F. either by traditional freezers on racks, or more efficiently with an IQF (instant quick freeze) freeze tunnel. This IQF process only takes a few minutes and afterwards the product can be singulated, sliced, diced, and boxed for sale to the customer. Alternatively, the infused fruit piece can be freeze-dried or drum-dried into a powder or even partially dehydrated with heat to a further dehydrated piece, which would have the low acid content and also can be turned into a dried infused fruit piece.

Creation of Enhanced Products

A commercial bakery essentially has only a handful of cranberry products available: frozen whole or frozen sliced cranberries, and cranberries that are sweetened with high concentrations of sugar and dried to a shelf-stable product (SDC's). In both products, there are characteristics that are not optimum for baking. The cranberry product finished in accordance with the present invention is unique in its attributes and flexibility.

In the inventions disclosed herein, the moisture content of the cranberry piece can be managed to a defined moisture level. Whole and sliced frozen fruit are essentially at a 88% moisture content while SDC's range from 6 to 18% moisture. The moisture content of fruit pieces processed in accordance with the inventions can be pinpointed at a specific moisture content within the range from 35% to 88%, with high uniformity. The fruit is deflated in the juice extraction process and then rehydrated to a standardized moisture content with the addition of infusion products such as juices, water, sugars, minerals, vitamins, and etc.

In the inventions disclosed herein, the sugar content (brix level) can be defined and can also cover a very wide range. Whole fruit has a brix level of about 8.0 brix. SDC have a brix level of upwards to 70 brix. The re-hydrated fruit pieces processed in accordance with the inventions disclosed herein can be produced with a brix range of 3.5 to 50 brix depending on the concentration and volume of infusion medium.

The acid concentration, measured as percent citric acid, can also be managed to cover a wide range. Whole fruit can have an acid level from 2.0 to 3.5% acid, which varies significantly by cultivar and growing region. In the inventions disclosed herein, the deflated and re-hydrated fruit piece can have a defined citric acid content as low as 0.80% citric, based on the infusion medium or mixture. Also, infusion of colors, flavors (sugars and savory), vitamins, and minerals, caffeine, and other ingredients can be accomplished.

In the invention of the subject application, a highly valuable cranberry juice has been created that is naturally derived with a higher than average brix and acid content. Whereas a typical single strength cranberry juice is between 6.5 and 8.0 brix, the cranberry juice derived from this invention has brix levels as high as 15 brix. This juice can be labeled as 'not from concentrate (NFC)', and to date, no other NFC cranberry juice has been attained at these high brix levels without some altering form of distillation, filtration, or concentration. In conclusion, by employing the inventions disclosed herein the aforementioned attributes are combined as a whole to provide customers with a wide range of opportunities for management of brix levels, juice content, moisture content, acid range, flavor profile, and mineral content and thus produce an unique product that is new and unprecedented in the baking industry as well as in others.

It is thought that the present invention and its advantages will be understood from the foregoing description and it is apparent that various changes may be made without departing from the spirit and scope of the invention or sacrificing its material advantages, the forms herein before described being merely preferred or exemplary embodiments thereof.

The invention claimed is:

1. A method for processing raw cranberry fruit to produce enhanced products, comprising the steps of:
   preconditioning a raw cranberry fruit, after harvest, by subjecting the raw cranberry fruit to a first sub-freezing temperature range over a first period of time to thereby allow migration of different concentrated fractions of cranberry fruit juice in the raw cranberry fruit based on brix concentration, to different localized regions within the cranberry fruit such that different concentrated cranberry fruit juice fractions can be recovered during a subsequent extracting step while the cranberry fruit is maintained in the same first sub-freezing temperature range as during said preconditioning;
   freezing the preconditioned cranberry fruit, subsequent to said preconditioning, by subjecting the preconditioned cranberry fruit to a second sub-freezing temperature range, below the first sub-freezing temperature range, over a second period of time shorter in length than the first period of time;
   thawing the preconditioned cranberry fruit, subsequent to said freezing, by subjecting the preconditioned cranberry fruit again to the first sub-freezing temperature range;
   tempering the preconditioned cranberry fruit, subsequent to said thawing, by maintaining the preconditioned cranberry fruit within the first sub-freezing temperature range during subsequent penetrating and extracting steps;
   penetrating the skin of the preconditioned cranberry fruit; and
   extracting and recovering from the preconditioned cranberry fruit a concentrated cranberry fruit juice in different concentrated cranberry fruit juice fractions.

2. The method of claim 1 wherein the first sub-freezing temperature range is between approximately 26° F. and 32° F.

3. The method of claim 1 wherein the second sub-freezing temperature range is between approximately 26° F. and 0° F.

4. The method of claim 1 wherein the first period of time is at least 7 days in length.

5. The method of claim 1 wherein said extracting is performed by using one or the other of a mechanical or bladder press to apply a predetermined range of pressure to substantially uniformly squeeze the preconditioned cranberry fruit.

6. The method of claim 1 wherein said penetrating the skin of the preconditioned cranberry fruit is performed by slicing the preconditioned cranberry fruit approximately in halves.

7. The method of claim 5 wherein the second sub-freezing temperature range is between approximately 26° F. and 0° F.

8. The method of claim 5 wherein said predetermined range of pressure is two bars of pressure.

9. The method of claim 5 wherein the first sub-freezing temperature range is between approximately 26° F. and 32° F. and the first period of time is at least 7 days in length.

10. A method for processing raw cranberry fruit to produce enhanced products, comprising the steps of:
    preconditioning a raw cranberry fruit, after harvest, by subjecting the raw cranberry fruit to a first sub-freezing temperature range between approximately 26° F. and 32° F. over a first period of time to thereby allow migration of different concentrated fractions of cranberry fruit juice in the raw cranberry fruit based on brix concentration, to different localized regions within the cranberry fruit such that different concentrated cranberry fruit juice fractions can be recovered during a subsequent extracting step while the cranberry fruit is maintained in the same first sub-freezing temperature range as during said preconditioning;
    freezing the preconditioned cranberry fruit, subsequent to said preconditioning, by subjecting the preconditioned cranberry fruit to a second sub-freezing temperature range between approximately 26° F. and 0° F. over a second period of time shorter in length than the first period of time;
    thawing the preconditioned cranberry fruit, subsequent to said freezing, by subjecting the preconditioned cranberry fruit again to the first sub-freezing temperature range;
    tempering the preconditioned cranberry fruit, subsequent to said thawing, by maintaining the preconditioned cranberry fruit within the first sub-freezing temperature range during subsequent penetrating and extracting steps;
    penetrating the skin of the preconditioned cranberry fruit; and
    extracting and recovering from the preconditioned cranberry fruit a concentrated cranberry fruit juice in different concentrated cranberry fruit juice fractions.

11. A method for processing a raw cranberry fruit to produce enhanced products, comprising the steps of:
    preconditioning a raw cranberry fruit, after harvest, by subjecting the raw cranberry fruit to a first sub-freezing temperature range over a first period of time to thereby allow migration of different concentrated fractions of cranberry fruit juice in the raw cranberry fruit based on brix concentration, to different localized regions within the cranberry fruit such that different concentrated cranberry fruit juice fractions can be removed during a subsequent extracting step while the cranberry fruit is maintained in the same first sub-freezing temperature range as during said preconditioning;
    freezing the preconditioned cranberry fruit, subsequent to said preconditioning, by subjecting the preconditioned cranberry fruit to a second sub-freezing temperature range, below the first sub-freezing temperature range, over a second period of time shorter in length than the first period of time;

thawing the preconditioned fruit, subsequent to said freezing, by subjecting the preconditioned cranberry fruit again to the first sub-freezing temperature range;

tempering the preconditioned cranberry fruit by maintaining the preconditioned cranberry fruit within the first sub-freezing temperature range during subsequent penetrating and extracting steps;

penetrating the skin of the preconditioned cranberry fruit; and extracting and removing a cranberry fruit juice in different concentrated cranberry fruit juice fractions from the preconditioned cranberry fruit to thereby produce a partially dehydrated cranberry fruit piece.

12. The method of claim 11 wherein the first sub-freezing temperature range is between approximately 26° F. and 32° F.

13. The method of claim 12 wherein the second sub-freezing temperature range is between approximately 26° F. and 0° F.

14. The method of claim 11 further comprising:

infusing the partially dehydrated cranberry fruit piece with a predetermined infusion medium while the cranberry fruit piece is maintained within the first sub-freezing temperature range to thereby produce a re-hydrated cranberry fruit piece.

15. The method of claim 14 wherein said infusing is performed while the partially dehydrated cranberry fruit piece is being tumbled in the infusion medium inside of a rotating vessel.

16. The method of claim 15 wherein said infusing is performed while the partially dehydrated cranberry fruit piece is also under vacuum.

* * * * *